US006875497B2

(12) United States Patent
Emery et al.

(10) Patent No.: US 6,875,497 B2
(45) Date of Patent: Apr. 5, 2005

(54) MULTILAYER COMPOSITE FOR THE DRY TRANSFER OF GRAPHICS TO RECEPTIVE SUBSTRATES

(75) Inventors: Philip R. Emery, Palmer, MA (US); Richard T. Skov, Spencer, MA (US)

(73) Assignee: FLEXcon Company, Inc., Spencer, MA (US)

( * ) Notice: Subject to any disclaimer, the term of this patent is extended or adjusted under 35 U.S.C. 154(b) by 0 days.

(21) Appl. No.: 10/140,779

(22) Filed: May 8, 2002

(65) Prior Publication Data

US 2003/0211294 A1 Nov. 13, 2003

(51) Int. Cl.[7] .............................. B32B 3/00; B32B 7/12; B41M 3/12

(52) U.S. Cl. .................... 428/195.1; 428/202; 428/207; 428/352; 428/354; 428/914

(58) Field of Search .............................. 428/195.1, 202, 428/352, 354, 914, 207, 195, 172, 214, 402; 156/277, 240

(56) References Cited

U.S. PATENT DOCUMENTS

| | | | | |
|---|---|---|---|---|
| 1,340,342 A | | 5/1920 | Horgan | |
| 1,446,104 A | | 2/1923 | Raven | |
| 3,212,913 A | | 10/1965 | MacKenzie | |
| 3,361,281 A | | 1/1968 | Kehe | |
| 3,562,087 A | | 2/1971 | Wigzell et al. | |
| 3,896,249 A | | 7/1975 | Keeling et al. | |
| 3,945,141 A | | 3/1976 | Frost | |
| 4,275,104 A | | 6/1981 | de Nagybaczon | |
| 4,308,310 A | | 12/1981 | Arnold et al. | |
| 4,517,044 A | | 5/1985 | Arnold | |
| 4,517,237 A | | 5/1985 | Pernicano | |
| 4,640,727 A | | 2/1987 | Janssen | |
| 4,770,732 A | | 9/1988 | Steelman | |
| 4,919,994 A | | 4/1990 | Incremona et al. | |
| 4,999,076 A | | 3/1991 | Incremona et al. | |
| 5,200,268 A | | 4/1993 | Hamada | |
| 5,204,206 A | | 4/1993 | Iwase et al. | |
| 5,232,527 A | | 8/1993 | Vernhet et al. | |
| 5,320,693 A | | 6/1994 | Helf | |
| 5,330,232 A | * | 7/1994 | Smith | 283/81 |
| 5,508,084 A | * | 4/1996 | Reeves et al. | 428/172 |
| 5,518,787 A | | 5/1996 | Konkol | |
| 5,547,738 A | | 8/1996 | Mitchell et al. | |
| 5,582,887 A | | 12/1996 | Etheredge | |
| 5,665,458 A | | 9/1997 | Mahn | |
| 5,695,588 A | | 12/1997 | Daems et al. | |
| 5,728,440 A | | 3/1998 | Good | |
| 5,730,823 A | | 3/1998 | Donat | |
| 5,773,111 A | | 6/1998 | Brewster | |
| 5,788,796 A | | 8/1998 | Look et al. | |
| 5,827,609 A | | 10/1998 | Ercillo et al. | |
| 5,871,837 A | | 2/1999 | Adair | |
| 5,916,723 A | | 6/1999 | Hand | |
| 5,958,560 A | | 9/1999 | Ewan | |
| 6,080,261 A | | 6/2000 | Popat et al. | |
| 6,129,965 A | * | 10/2000 | Langan | 428/41.8 |
| 6,129,966 A | | 10/2000 | Narita et al. | |
| 6,143,407 A | | 11/2000 | Lythgoe et al. | |
| 6,149,753 A | | 11/2000 | Huang | |
| 6,183,862 B1 | | 2/2001 | Ko et al. | |
| 6,228,486 B1 | | 5/2001 | Kittel et al. | |
| 6,235,363 B1 | | 5/2001 | Bilodeau | |
| 6,251,824 B1 | | 6/2001 | Ueno et al. | |
| 6,270,871 B1 | | 8/2001 | Scholz et al. | |
| 6,299,967 B1 | | 10/2001 | Collins et al. | |
| 6,423,406 B1 | | 7/2002 | Bilodeau | |
| 6,432,190 B1 | | 8/2002 | Scholz et al. | |
| 2002/0182384 A1 | | 12/2002 | Rhein | |

FOREIGN PATENT DOCUMENTS

| | | |
|---|---|---|
| DE | 90 90 114.2 | 7/1992 |
| EP | 0 976 580 A1 | 2/2000 |
| WO | WO 95/17312 | 6/1995 |

OTHER PUBLICATIONS

Evans "Choosing The Right Cold Laminating Films" *Digital Graphics* (Feb. 2000), 3 pages.

William Frick & Company "Label & Decal Anatomy" 2 pages.

William Frick & Company "Labels & Decals" 6 pages (labeled pp. 6–11).

* cited by examiner

*Primary Examiner*—Bruce H. Hess
*Assistant Examiner*—Lawrence Ferguson
(74) *Attorney, Agent, or Firm*—Gauthier & Connors LLP

(57) ABSTRACT

A multilayer composite for applying printed graphics to a receptive substrate, comprising: a carrier sheet; a transparent breakcoat having an upper surface releasably bonded to the carrier sheet, and a lower print receptive surface on which graphics are permanently printed; and a layer of pressure sensitive adhesive having an upper surface permanently adhered to the thus printed graphics, and a lower surface releasably adhered to a protective liner. The protective liner is separable from the adhesive without disrupting the bond between the carrier sheet and the breakcoat, and the adhesive, and the adhesive is removably bondable to the substrate during a wet out period, after which the carrier sheet is separable from the breakcoat, allowing the breakcoat/graphics/adhesive residue to remain firmly bonded to the substrate.

10 Claims, 1 Drawing Sheet

MULTILAYER COMPOSITE FOR THE DRY TRANSFER OF GRAPHICS TO RECEPTIVE SUBSTRATES

BACKGROUND DISCUSSION

1. Field of the Invention

This invention relates to the dry transfer of printed graphics onto receptive substrates.

2. The Prior Art

Various dry transfer techniques have been developed for applying graphics to substrates. Of these, perhaps the most common involves the printing of graphics on carrier films which are then adhesively secured to the substrates, typically by pressure sensitive adhesives. The printed films may be applied in sheet or roll form to cover large areas, or they may be die cut into labels or decals for application to smaller areas.

A different approach is described in U.S. Pat. No. 4,517,044 (Arnold) where a dry transfer decal is produced without a carrier film by successively printing the underside of a base sheet with a cross-linked abrasion resistant carrier coat, the graphics, and a high tack pressure sensitive adhesive. Once the adhesive is applied to the substrate, the base sheet is removed from the carrier coat, leaving as a transferred residue the graphics protected by the carrier coat and adhered to the substrate by the adhesive.

There are several drawbacks to the Arnold approach. First, the immediate bond created by the high tack pressure sensitive adhesive prevents the decal from being removed from and repositioned on the substrate during initial application. This can be particularly troublesome when applying large area graphics in sheet or roll form.

The thickness of the carrier coat, which ranges from 0.005 to 0.020 inches, contributes disadvantageously to the overall thickness of the decal, thus precluding its use as an underlayer beneath transparent top coats.

Also, where the graphics are intended only for temporary display, to be replaced after a relatively short period of time by other fresh graphics, the abrasion resistance of the cross-linked carrier coat resists removal, making it necessary to resort to more rigorous, costly and time consuming removal techniques and procedures.

SUMMARY OF THE INVENTION

The present invention is an improved multilayer composite for applying printed graphics to a receptive substrate.

The composite includes: a carrier sheet; a transparent breakcoat having an upper surface releasably bonded to the carrier sheet, and a lower print receptive surface on which graphics are permanently printed; and a layer of pressure sensitive adhesive having an upper surface permanently adhered to the thus printed graphics, and a lower surface releasably adhered to a protective liner.

The protective liner is separable from the adhesive in response to the application of a first peel force of sufficient magnitude to initiate release, and the carrier sheet is likewise separable from the breakcoat in response to the application of a second peel force sufficient to initiate break.

The first peel force is lower than the second peel force, thereby accommodating removal of the release liner and exposure of the adhesive without disrupting the bond between the carrier sheet and the breakcoat.

The adhesive is bondable to a receptive substrate with an immediate peel force that is lower than the second peel force, and that increases in strength during a wet out period to an elevated peel force that is higher than the second peel force. Thus, during the wet out period, the adhesive is separable from the substrate without disrupting the bond between the breakcoat and the carrier sheet, thereby allowing the graphics to be repositioned on the substrate. Repositionability is particularly critical to the successful application of large graphics, where misalignment, wrinkling and entrapment of air is often experienced during initial application. Following expiration of the wet out period, the carrier sheet is removable from the breakcoat without disrupting the bond between the adhesive and the substrate.

The breakcoat has a thickness of less than about 1 mil, and preferably between about 0.2 and 0.8 mils, with the combined thickness of the breakcoat, graphics and adhesive being about less than 6.0 mils, and preferably between about 2.5 and 3.5 mils. As such, the three layer deposit is ideally suited for application as a sublayer beneath subsequently applied transparent top coats.

The relatively thin breakcoat provides a modicum of protection for the graphics during the application process and prior to subsequent coverage by the transparent top coats. Where removability is a factor, for example in short term floor graphics applications beneath protective wax layers, the breakcoat is provided with a relatively low resistance to abrasion of between about 100 to 200 cycles, and the adhesive, graphics and breakcoat are selected for their solubility in the alkali or solvent based solutions commonly employed in conventional mechanical floor stripping procedures.

These and other features and advantages of the present invention will now be discussed in greater detail, with reference to the accompanying drawings, wherein:

BRIEF DECSRIPTION OF THE DRAWINGS

DEFINITIONS AND STANDARDS

As herein employed, the term, "receptive substrate" means a substrate having a surface energy level of between about 30 to 72 dynes/cm.

Abrasion resistance is measured using a Taber Abrader (ASTM D 4060-95) with CS-17 wheels and 500 gram weights.

Peel force is measured in accordance with the 90° peel method as outlined in ASTM D-6252/D6252 M-98. Testing is done at twelve inches/minute with a one inch wide tape.

Adhesive internal strength is measured in accordance with ASTM D6463-99. Testing is done with a four pound weight attached to a tape that is adhered to stainless steel with a one inch square bond area. The adhesive is allowed to bond for one hour prior to attaching the weight.

DETAILED DESCRIPTION OF PREFERRED EMBODIMENT

Figure 1:
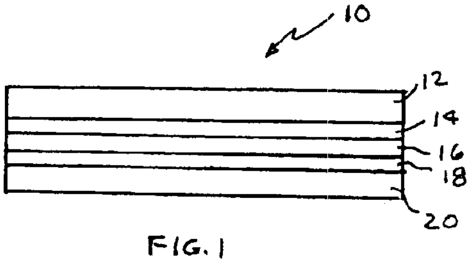
FIG. 1 is a sectional view through a multilayer composite in accordance with the present invention.
Figure 2:
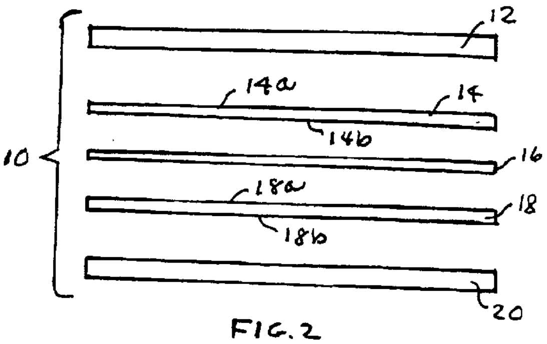
FIG. 2 is an exploded view of the components of the composite.

With reference initially to FIGS. 1 and 2, a multilayer composite in accordance with the present invention is generally depicted at 10. The composite includes a carrier sheet 12; a transparent breakcoat 14 having an upper surface **14*a*** releasably bonded to an underside of the carrier sheet; graphics 16 permanently printed on a lower surface 14*b* of the breakcoat; a layer of pressure sensitive adhesive 18 having an upper surface 18*a* permanently adhered to the graphics; and a protective liner 20 releasably adhered to a lower surface 18*b* of the adhesive.

The carrier sheet 12 may be a film selected from the group consisting of polyester, polypropylene, polyethylene and polystyrene. The breakcoat 14 may be selected from the group consisting of polyvinyl chloride, acrylic, acrylic copolymers, polyvinyl acetate and copolymers, polyvinyl alcohol and copolymers, polyethylene, vinyl acetate, and may be applied to the underside of the carrier sheet by known techniques, including for example coating via reverse roll, reverse gravure, forward gravure, slot die, wire round rod, knife over roll, and extrusion.

Breakcoat thicknesses of less than about 1.0 mil are employed, with thicknesses of between about 0.2 and 0.8 mils being preferable. As noted previously, when the graphics are intended for short term display as a sublayer beneath one or more transparent protective layers, to be replaced by other graphics after a relatively short period of time, the breakcoat is preferably provided with a modest resistance to abrasion of between about 100 to 200 cycles. This insures that the graphics are sufficiently protected during application, without disadvantageously impeding subsequent removal.

The graphics 16 may be applied by known techniques, including for example screen printing, or flexo-printing. Graphic thicknesses will vary, depending in large part on the number of successively applied colors.

The pressure sensitive adhesive 18 may be selected from the group consisting of acrylic, modified acrylic, or rubber spaced, and may again be applied by known techniques, including for example coating via reverse roll, offset gravure, forward gravure, reverse gravure, slot die, wire round rod, knife over roll and extrusion The protective liner 20 may comprise a silicone release layer on a polyester liner, polyethylene coated paper, a polypropylene coated paper, clay coated paper, or any other comparable commercially available releasable liner.

Figure 3:
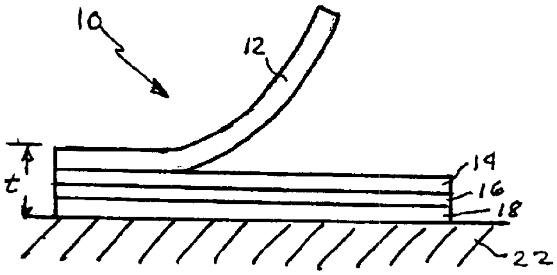
FIG. 3 shows the breakcoat/graphics/adhesive composite being applied to a substrate.

The protective liner 20 is separable from the adhesive layer 18 in response to the application of a first peel force sufficient to initiate release, and the carrier sheet 12 is separable from the breakcoat 14 in response to the application of a second peel force sufficient to initiate break. The first peel force is lower than the second peel force to thereby accommodate removal of the release liner and exposure of the adhesive 18 without disrupting the bond between the carrier sheet 12 and the breakcoat 14. With reference to FIG. 3, it will be seen that the thus exposed adhesive 18 is bondable to a receptive substrate 22 with an immediate peel force that is lower than the second peel force, and that increases during a wet out period to an elevated peel force that is higher than the second peel force. Thus, during the wet out period, the graphics 16 may can be removed from and repositioned on the substrate without disrupting the bond between the breakcoat 14 and the carrier sheet 12. Following expiration of the wet out period, the carrier sheet 12 may be separated from the breakcoat, without disrupting the bond of the adhesive to the substrate. The transferred residue comprising the breakcoat, graphics and adhesive has a combined thickness "t" of less than about 6.0 mils, and preferably between about 2.5 to 3.5 mils.

The second peel strength of the bond between the breakcoat 14 and carrier sheet 12 is between about 100 and 400 grams/inch, and is preferably about 250 grams/inch.

The wet out period is at least 5 minutes, thereby providing adequate opportunity for graphic repositioning. The adhesive layer 18 is provided with an internal strength sufficient to resist edge ooze during the graphic preparation and installation process. An adhesive having an internal strength of at least about 20 hours is preferred.

The following are examples of multilayer composites embodying the concepts of the present invention:

EXAMPLE 1

A multilayer composite was prepared from the following components:

A carrier sheet available under product designation "PM 500 Clear Breakcoat" from FLEXcon Inc. of Spencer, Mass., U.S.A. (hereinafter "FLEXcon") and comprising of 5 mil polyester film with a clear vinyl based breakcoat bonded thereto with a peel strength of 214 grams/inch.

Graphics 16 comprising 6 successive applications of UV cured inks.

A protective liner available under the product designation "TT-100 EXA-131" from FLEXcon and comprising a one mil polyester film coated with an acrylic pressure sensitive adhesive. The adhesive has an internal strength of 30+ hours and is bonded to the protective liner with a peel strength of 16 grams/inch.

The graphics were printed on the breakcoat and cured. The protective liner was then adhered to the thus printed and cured graphics by means of the adhesive Component thicknesses measured in mils were as follows:

| | |
|---|---|
| Carrier sheet | 5.0 |
| Breakcoat | 0.4 |
| Graphics | 2.0 |
| Adhesive | 0.98 |
| Protective Liner | 1.10 |
| Total | 9.48 |

The protective liner was removed without disrupting the bond of the breakcoat to the carrier sheet, thus exposing the adhesive for application to a receptive substrate comprising a polished stainless steel plate with a surface energy level of 39–40 dynes/cm. The bond of the adhesive to the substrate exhibited an immediate peel strength of 30 grams/inch, which rose to 60–170 grams/inch during the first minute. After 5 minutes, the adhesive bond exhibited an elevated peel strength above the peel strength of the breakcoat to the carrier sheet, thus allowing the carrier sheet to be removed without disrupting the bond of the adhesive to the substrate. The transferred breakcoat/graphics/adhesive residue had an overall thickness of 3.38 mils.

EXAMPLE 2

A multilayer composite was prepared in the same manner and except for the breakcoat, from the same components as described in Example 1. An acrylic breakcoat was applied to a 5 mil polyester carrier sheet. The coated carrier sheet is available from FLEXcon under product designation PM EXBCA-76. Breakcoat thickness is 0.8 mils, resulting in a total composite thickness of 9.88 mils, with the thickness of the breakcoat/graphics/adhesive transfer to the substrate being 3.78 mils. The breakcoat has a resistance to abrasion of 125 cycles, and is adhered to the carrier sheet with a peel strength of 225 grams/inch. Bond levels to the polished stainless steel plate were as described in Example 1, allowing the graphics to be repositioned on the substrate during a wet out period of 5 minutes, after which the carrier sheet was separated from the breakcoat without disrupting the bond of the adhesive to the substrate.

EXAMPLE 3

A multilayer composite was again prepared in the same manner and except for the adhesive, from the same components as described in Example 1. The protective liner was coated with a 1 mil layer of an aggressive pressure sensitive adhesive. The coated liner is available from FLEXcon under product designation TT-100 V-344. Total composite thickness was 9.48 mils, with the thickness of the breakcoat/graphics/adhesive transfer to the substrate being 3.38 mils.

Within one minute, the bond of the adhesive to the substrate exceeded the peel strength of the breakcoat to the carrier sheet.

In light of the foregoing, it will be seen that the composites of Examples 1 and 2 are ideally suited for use in transferring large area graphics, where repositionability is critical during the application process. Such composites may be employed, for example, in floor graphic applications, as sublayers beneath protective wax top coats. The relatively low abrasion resistance of the breakcoat allows the composite sublayers to be readily abraded along with the wax topcoats, thus facilitating stripping and replacement of the graphics.

The composite of Example 3 lacks repositionability and is thus more suited for smaller graphics and decals that are permanently applied as extremely thin sublayers beneath clear coats.

It will be appreciated by those skilled in the art that other functionally equivalent components and application procedures may be substituted for those identified in the preceding text without departing from the inventive concepts defined by the appended claims.

We claim:

1. A multilayer composite for applying printed graphics to a receptive substrate, said composite comprising:

a carrier sheet;

a transparent breakcoat having an upper surface releasably bonded to said carrier sheet, and a lower surface on which said graphics are permanently printed; and a layer of pressure sensitive adhesive having an upper surface permanently adhered to said graphics, and a lower surface releasably adhered to a protective liner, said protective liner being separable from said adhesive in response to the application of a first peel force sufficient to initiate release, and said carrier sheet being separable from said breakcoat in response to the application of a second peel force sufficient to initiate break, said first peel force being lower than said second peel force to thereby accommodate removal of said release liner and exposure of said adhesive without disrupting the bond between said carrier sheet and said breakcoat, and said adhesive being bondable to said substrate with an immediate peel force that is lower than said second peel force and that increases in strength during a wet out period to an elevated peel force that is higher than said second peel force, said adhesive being removable from and rebondable to the said substrate during said wet out period without disrupting the bond between said breakcoat and said carrier sheet, thereby allowing said graphics to be repositioned on the substrate, and said carrier sheet being separable from said breakcoat following expiration of said wet out period to thereby allow said graphics to remain covered by said breakcoat and bonded to said substrate by said adhesive.

2. The composite of claim 1 wherein said breakcoat has a thickness of less than about 1.0 mil.

3. The composite of claim 2 wherein the thickness of said breakcoat is between about 0.2 and 0.8 mils.

4. The composite of claim 1, 2 or 3 wherein said breakcoat has a resistance to abrasion of between about 100–200 cycles.

5. The composite of claim 1, 2 or 3 wherein the combined thickness of said breakcoat, printed graphics and adhesive layer is less than about 6.0 mils.

6. The composite of claim 5 wherein said combined thickness is between about 2.5 and 3.5 mils.

7. The composite of claim 1 wherein said second peel force is between about 100 and 400 grams per inch.

8. The composite of claim 7 wherein said second peel force is about 250 grams per inch.

9. The composite of claim 1 wherein said wet out period is at least 5 minutes.

10. The composite of claim 1 wherein said adhesive has an internal strength of at least about 20 hours.

* * * * *